J. F. HARDEN.
CULTIVATOR.
APPLICATION FILED JULY 27, 1920.
1,415,638.
Patented May 9, 1922.
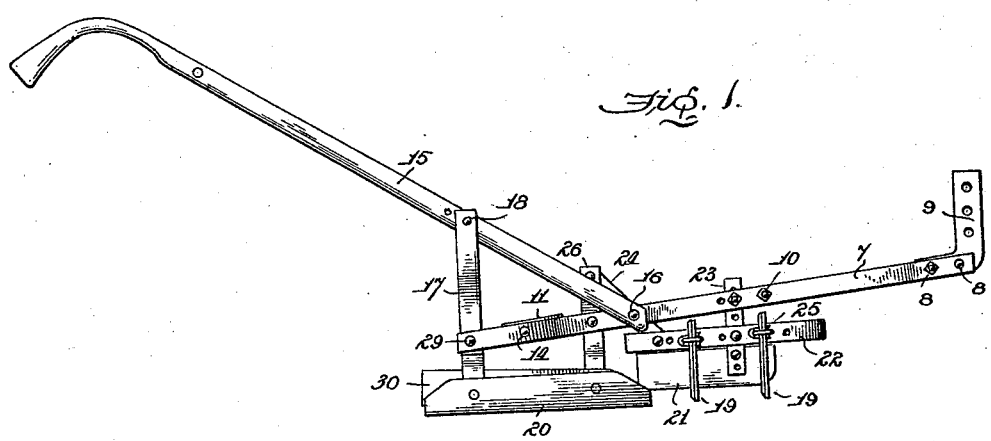
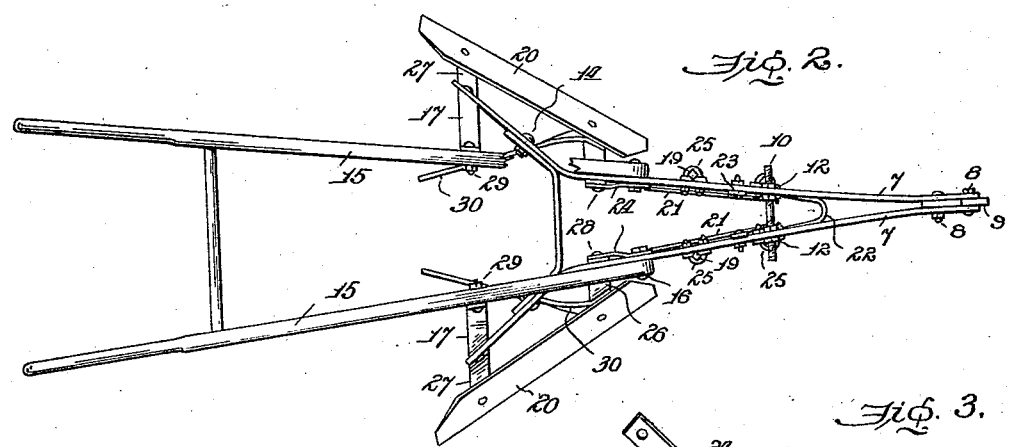
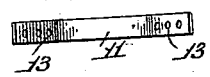
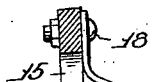
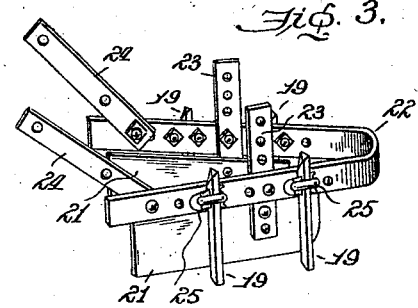
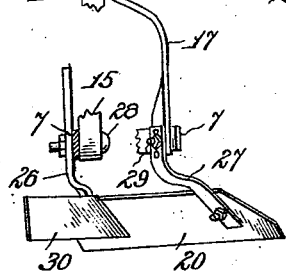
Jessie F. Harden,
INVENTOR.
BY Cornee S Beall
ATTORNEY.

UNITED STATES PATENT OFFICE.

JESSIE F. HARDEN, OF BRUNDIDGE, ALABAMA.

CULTIVATOR.

1,415,638.  Specification of Letters Patent.  Patented May 9, 1922.

Application filed July 27, 1920. Serial No. 399,301.

*To all whom it may concern:*

Be it known that I, JESSIE F. HARDEN, a citizen of the United States, residing at Brundidge, in the county of Pike and State of Alabama, have invented a Cultivator, of which the following is a full and complete specification.

My invention is an improvement in cultivators of that particular type employed in the cultivation of growing plants by straddling the row so that the attachments or implements for working the soil will operate at both sides of the growing plants; the present invention being an improvement upon the cultivator machine shown, described and claimed in my co-pending application filed November 18, 1919, Serial No. 338,821, and comprehends certain changes in the general structure to facilitate the adjustment of parts as well as increase the effectiveness of the machine in its operation.

In the present instance I simplify the connection of the harrow-teeth and guiding-plates to the frame of the machine so as to allow for a more convenient adjustment of the same with respect to said frame and to each other, and also provide a simple arrangement for adjusting the spread of the side pieces comprising the main frame as well as incorporate means for varying the inclination of the scraper blades so that they will dig to a more or less extent into the soil.

This invention provides a cultivator which is light in construction consistent with the work it accomplishes, is of light draft and easily handled to operate over a row of plants, may be readily adjusted to suit different conditions with respect to the plants and bed to be cultivated, and in use will work the soil at both sides of a row of growing plants and between the rows by harrowing close up to said plants, plowing or scraping the surface of the bed beyond the path of travel of the harrow-teeth, and shape the bed, all in one operation of the machine and in a thorough and effective manner.

With these principal objects in view my present invention consists in the particular construction and arrangement of the several cooperating parts constituting the improved cultivator, all as hereinafter fully described and more specifically set forth in the appended claim.

In the accompanying drawings:

Fig. 1 is a side elevation of a cultivator constructed in accordance with my invention.

Fig. 2 is a plan view thereof.

Fig. 3 is an enlarged view, in perspective, of the harrow-teeth and guiding-plates and frame which carries the same.

Fig. 4 is a detail view of the spreader-bar for adjusting the side pieces of the main frame, and Fig. 5 is an enlarged view, in rear elevation, of one of the scraper-blades and standards by which it is suspended from the main frame.

As it is the main purpose of my invention to provide a machine that is especially adapted for the cultivation of gardens or fields in which are grown such plants as cotton, peanuts, vegetables, etc., I have arranged the implements to straddle a row of growing plants to work the soil at both sides thereof without injuring the same, and have also contemplated a size of machine that will require but a single animal to draw it and one man to operate it; and though I have herein comprehended a preferred embodiment of the invention it will be understood that modifications or changes may be made in details of construction to accomplish the same purpose, within the spirit and scope of my claim.

In carrying out my present invention I construct the main frame of the machine in the triangular form shown in my aforesaid application, with the two diverging metal side pieces 7 7 connected together at their forward ends by the bolts 8 which attach the clevis 9, and further connect said side pieces by a transverse brace-rod 10 and spreader-bar 11, the latter being interposed between the rear flared ends of the side pieces. The brace-rod and spreader bar give the required rigidity to the cultivator-frame and also provide for separating the side pieces to a more or less extent so as to vary the working positions of the cultivating implements, hereinafter described, carried thereby; for which purpose the rod is threaded at both ends to receive the binding nuts 12 and the ends of the spreader-bar, which are bent to correspond with the angle of the flared ends of the side pieces, are provided with several holes, 13, to receive the attaching-bolts 14. With this arrangement the adjustment of the side pieces is easily accomplished by simply removing the bolts 14 and forcing the spreader-bar forward between the flared ends to increase the divergence of said side pieces or moving it rearward to decrease the divergence or spread and so that the corresponding bolt-holes 13 will register with the companion bolt-holes in said side pieces, after which the binding-nuts on the brace-rod are manipulated to the desired extent. The cultivator-frame is provided with a pair of conventional handles 15, which are connected at their forward ends to the side pieces 7 by bolts 16 and suitably braced by metal strips or standards 17 bolted to and rising from the rear extremities of said side pieces for connection to the handles by bolts 18, and to provide for adjusting said handles vertically they are each provided with one or more extra holes to receive the bolt 18, and in this instance the aforesaid standards pivot on the bolts 29 connecting them to the side pieces.

For the purpose of cultivating the plants I provide two sets of harrow-teeth 19 disposed at opposite sides of the longitudinal center of the machine with a pair of scraper-blades likewise disposed but so as to travel beyond the paths of said harrow-teeth, the scraper-blades being arranged obliquely and designed to either scrape the bed for removing weeds or cut into the soil for more thoroughly cultivating between the rows, while the harrow-teeth operate close to the plants to break the surface crust or pulverize the soil without disturbing the roots of the plants, and in order to protect the plants from the earth thrown up by these implements and more especially steady the draft of the cultivator with respect to the row of plants I provide vertical oblong plates 21, which may be termed "guiding plates," and locate them at the inner side of each set of harrow-teeth and companion scraper blades, said guiding plates thereby travelling at each side of the growing plants.

In the present instance the two sets of harrow-teeth 19 and the pair of guiding-plates 21 are carried by a frame 22, which is suspended from and securely braced to the side pieces 7 of the cultivator-frame and consists of a flat bar bent upon itself centrally with the two members to which the implements are attached extending rearwardly, and said frame is connected to the side pieces of the cultivator-frame by metal strips 23 and 24, the strips 23 being attached to the carrier-frame 22 near the forward end thereof while the strips 24 are attached to near the rear ends of said carrier-frame and extend therefrom at an oblique angle. As will be noted the members of the flat bar constituting the carrier-frame diverge to the same extent as the side pieces of the cultivator frame and are disposed beneath the same, and being connected directly to said side pieces will be adjusted or spread apart to a more or less extent with the same. To provide for adjusting this carrier-frame both vertically and longitudinally with respect to the cultivator frame the members of said carrier-frame and the supporting strips 23 and 24 are provided with extra holes to receive the attaching-bolts, as shown in Fig. 3. The harrow-teeth 19 are secured to the outer sides of the carrier-frame by means of clips 25, while the guiding-plates 21 are bolted to the inner sides of the metal strips 23, for which purpose the latter are extended below the frame. Obviously this frame may be adjusted bodily to and from the cultivator-frame, or tilted at its forward end up or downward with respect thereto, and said frame may be moved backward or forward to change its relation to the scraper-blades. Furthermore, this arrangement for supporting the harrow-teeth and guiding-plates from the cultivator-frame not only provides a firm connection but permits these implements, with the frame, to be readily removed when it is desired to use only the scraper blades to scrape or plow between the rows, the removal being accomplished by simply removing the bolts which connect the strips 24 to the carrier-frame and the bolts which connect the strips 23 to the side pieces 7.

The scraper-blades 20 are secured to the flared rear ends of the side pieces of the cultivator-frame by means of metal strips or standards 26 and 27, each standard 26 extending from the forward end of a blade to the inner side of the adjoining side piece for the attachment thereto by the bolt 28 (Fig. 2), while the standard 27 extends from the rear end of the blade for attachment to the rear extremity of the side piece by the same bolt, 29, which connects the handle-brace 17 thereto; both of the aforesaid standards, as well as the handle-brace, being bent and twisted as shown in Fig. 5 to accommodate the relative location of the parts to which they are connected, and the upper end of the standards 27 are provided with extra bolt-holes for adjusting the rear ends of the scraper-blades to thereby change their tilt so that they may dig into the soil to a more or less extent. To more securely brace the forward ends of these scraper-blades, and also more securely brace the rear end of the frame carrying the harrow-teeth and guiding-plates the standards 26 are extended above the side pieces 7 and the links 24 similarly extended and connected to the upper ends of the standards.

To limit the depth of cut of the scraper blades 20, and assist the guiding plates in steadying the progress of the cultivator in its operation along the bed said blades are provided with rearwardly extending plates or wings 30 attached to the inner sides of the forward ends thereof by the bolts which connect the blades to the standards 26, and the aforesaid purposes are accomplished in a more effective manner in the present instance by disposing said plates so that they will converge. This disposition of the plates also provides for shaping the bed at opposite sides of the row of growing plants.

From the foregoing description of the construction of my improved cultivator it will be seen that the several implements all cooperate to work the soil in a peculiarly effective manner at both sides of a row of growing plants; for as the machine is drawn over the bed the harrow teeth operate to gently break or pulverize the soil close up to the plants without disturbing their roots, and the scraper blades act to remove weeds and further cultivate the bed beyond the path of said harrow-teeth, while the oblong plates 21 not only serve to cooperate with the wings on the scraper blades in steadying the draft of the cultivator but also work the soil close to the plants, the several operations subjecting the bed to treatment that usually requires more than one trip over the same when the ordinary implements are employed. Furthermore, it will be noted that the construction of the machine is very light without sacrificing its stability and durability, and inasmuch as the cultivator-frame and implements it carries are adjustable, and some of the implements are carried by a frame in the form of an attachment that is readily removable, the utility of the machine is increased to the extent of permitting various treatments of a bed or garden; whereby my improved cultivator is particularly well adapted for cultivating and shaping beds of growing plants, such as cotton, peanuts, and different kinds of vegetables, being not only susceptible of easy and economical operation but subjecting the bed or garden to a form of treatment that will materially enhance the growth of the plants.

By reference to Fig. 3 of the drawings it will be noted that the clips 25 which are employed for attaching the harrow-teeth to the removable frame provide for disposing said teeth at an angle instead of vertically, for in addition to the U-bolt there is a plate pivoted on one member of said U-bolt and having a channel receiving the harrow-tooth and notches at its outer end to receive the other member of said U-bolt; so that the said harrow-teeth may be adjusted to either dig or drag, as may be desired. In this figure of the drawings the links 24 are shown in connection with the carrier-frame but it will be understood that in removing said carrier-frame from the machine it is not necessary to also remove said links but merely remove the bolts at the lower ends of the same, so that said links may remain on the machine to brace the connection of the scraper-blades thereto.

Having thus described my invention, I claim:

In a straddle-row cultivator, the combination with the diverging side pieces having handles of an attachment comprising a bar bent upon itself in substantial U-shape to provide side members, a plurality of harrow-teeth attached to each side member for cultivating the soil at both sides of a row of plants, vertical oblong plates attached to the side members respectively to extend longitudinally at the inner side of the harrow-teeth, and metal strips extending upwardly from the side members of the attachment for connecting the latter to the side pieces of the cultivator, substantially as shown and for the purpose set forth.

JESSIE F. HARDEN.